Patented May 16, 1933

1,909,903

UNITED STATES PATENT OFFICE

CURT SCHUMANN, REINHOLD FICK, AND ERWIN OBERREIT, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF COMPOUNDS OF CALCIUM AND MAGNESIUM CYANIDES

No Drawing. Application filed May 14, 1928, Serial No. 277,786, and in Germany May 20, 1927.

We have found that double compounds of the cyanides of calcium, or magnesium and ammonia are advantageously produced by allowing hydrocyanic acid and ammonia to act upon compounds of the said alkaline earth metals, such as their oxids, hydroxids and water-soluble salts, suspended or dissolved in organic liquids, such as alcohols, for example methyalcohol, ethylalcohol, etc., or ether, benzene, pyridine and the like.

Small amounts of water such as are contained in some salts of calcium or magnesium as water of crystallization, or formed during reaction, when acting for instance on dry oxids or hydroxids of calcium or magnesium, may be present during reaction, as the said amounts of water do not act deleteriously. When working in a suspension or solution of an organic liquid not miscible with water, the latter separates out and may be drawn off from time to time. In case organic liquids forming solutions with water, such as lower alcohols, are used, the water is often at least partly retained by the double compounds formed in the drying operation as the alcohols are more easily volatilized and the water cannot easily be removed by drying at higher temperatures, as the double compounds readily undergo decomposition by heating even when drying in vacuo, or in a current of inert gas. It is therefore advisable to treat the double compounds separated from the mother liquor with a current of dry ammonia or wash them with hygroscopic organic liquids such as alcohols of high percentage strength. According to this manner of working, the water present in the product is completely or to a large extent removed without any decomposition taking place. The resulting double salt, which, under certain circumstances, is damp through the presence of alcohol, can then be freed from the adherent alcohol, without any special precaution by heating it in a drying cupboard or other suitable drying apparatus, preferably in a partial vacuum. The products so obtained have practically the same cyanogen content in relation to the calcium content as the initial materials, and will keep indefinitely when moisture is excluded. The accumulation of the water of reaction in the reaction product can also be avoided.

The double compounds of the cyanides of calcium or magnesium and ammonia are readily decomposed by heating, if desired under diminished pressure, to form the corresponding cyanides.

The following examples will further illustrate the nature of the said invention which however is not limited thereto.

Example 1

Calcium hydroxid or oxid is suspended in methyl- or ethyl alcohol of 96 per cent strength and hydrocyanic acid gas mixed with ammonia is passed at about 20° C. through the vigorously stirred suspension, a crystalline ammonia-calcium cyanide being obtained. Alcohol may be replaced by other anhydrous liquids, for example, ether, benzene, pyridine and the like.

Example 2

To a suspension of 58 parts by weight of magnesium hydroxid in about 300 parts by weight of ethyl alcohol of 96 per cent strength, 54 parts by weight of hydrocyanic acid are added. About 40 parts by weight of gaseous ammonia are introduced into the mixture at about 20° C. It is not necessary that the initial materials are entirely free from water. Ammonia may also be first added and afterwards hydrocyanic acid, or a mixture of ammonia and hydrocyanic acid may be employed.

After stirring for a while the magnesium cyanide diammoniate is separated from the mother liquor, washed with ethyl alcohol almost free from water and dried by heating in vacuo. A magnesium cyanide diammoniate of 80 to 90 per cent purity is obtained. The product may be decomposed into magnesium cyanide and ammonia by treating it to temperatures above 250° C. in vacuo.

Other alcohols such as methyl alcohol, may be used instead of ethyl alcohol, likewise magnesium oxid may be employed instead of magnesium hydroxid.

*Example 3*

54 parts by weight of hydrocyanic acid are added to a solution of 256 parts by weight of crystallized magnesium nitrate in about 300 parts by weight of ethyl alcohol, whereupon ammonia is introduced while cooling until no magnesium cyanide diammoniate is anymore precipitated. The crystalline deposit is treated as described in Example 2. The product is of 92 per cent purity.

The mother liquor is worked up for ammonium nitrate. Other water-soluble magnesium salts may be used instead of magnesium nitrate.

What we claim is:—

1. A process for the production of a compound of the type $Me(CN)_2 \cdot xNH_3$ wherein Me is an alkaline earth metal having an atomic weight not higher than 41 which comprises acting on a compound of such alkaline earth metals, selected from the group consisting of their oxides, hydroxides and water soluble salts, distributed in an inert organic liquid, with hydrocyanic acid and ammonia.

2. A process for the production of a compound of the type $Me(CN)_2 \cdot xNH_3$ wherein Me is an akaline earth metal having an atomic weight not higher than 41 which comprises acting on a compound of such alkaline earth metals, selected from the group consisting of their oxides, hydroxides and water soluble salts, distributed in an aliphatic alcohol of low molecular weight, with hydrocyanic acid and ammonia.

3. A process for the production of a compound of the type $Me(CN)_2 \cdot xNH_3$ wherein Me is an alkaline earth metal having an atomic weight not higher than 41 which comprises acting on a compound of such alkaline earth metals, selected from the group consisting of their oxides, hydroxides and water soluble salts, distributed in ethyl alcohol, with hydrocyanic acid and ammonia.

4. A process for the production of a compound of the type $Me(CN)_2 \cdot xNH_3$ wherein Me is an alkaline earth metal having an atomic weight not higher than 41 which comprises acting on a compound of such alkaline earth metals, selected from the group consisting of their oxides, hydroxides and water soluble salts, distributed in an inert organic liquid, with hydrocyanic acid and ammonia, separating the double compound formed from the mother liquor, and washing said compound with an inert hygroscopic organic liquid.

5. A process for the production of a compound of the type $Me(CN)_2 \cdot xNH_3$ wherein Me is an alkaline earth metal having an atomic weight not higher than 41 which comprises acting on a compound of such alkaline earth metals, selected from the group consisting of their oxides, hydroxides and water soluble salts, distributed in an organic liquid, with hydrocyanic acid and ammonia, separating the double compound formed from the mother liquor, and washing said compound with ethyl alcohol of high percentage strength.

6. The process of preparing a cyanide product which comprises suspending powdered lime in a non-aqueous organic liquid medium which is chemically inert to the reactants and to the product, has substantially no hydrolytic or solvent effect on the product, and boils at a point between about 25° and 84° C., and acting on said suspension with hydrocyanic acid, and ammonia in the presence of a small amount of water.

7. The process of preparing a cyanide product which comprises suspending powdered lime in ethyl ether, and acting on said suspension with hydrocyanic acid, and ammonia in the presence of a small amount of water.

In testimony whereof we have hereunto set our hands.

CURT SCHUMANN.
REINHOLD FICK.
ERWIN OBERREIT.